(12) United States Patent
Bregonzio (10) Patent No.: US 8,287,679 B2
(45) Date of Patent: Oct. 16, 2012

(54) METHOD FOR FORMING A PROTECTIVE COAT ABOUT A CUTBACK BETWEEN PIPES FORMING PART OF AN UNDERWATER PIPELINE

(75) Inventor: Valerio Bregonzio, San Donato Milanese (IT)

(73) Assignee: SAIPEM S.p.A., San Donato Milanese (IT)

( * ) Notice: Subject to any disclaimer, the term of this patent is extended or adjusted under 35 U.S.C. 154(b) by 485 days.

(21) Appl. No.: 12/449,900

(22) PCT Filed: Feb. 29, 2008

(86) PCT No.: PCT/IB2008/000441
§ 371 (c)(1),
(2), (4) Date: Feb. 26, 2010

(87) PCT Pub. No.: WO2008/107759
PCT Pub. Date: Sep. 12, 2008

(65) Prior Publication Data
US 2010/0186881 A1 Jul. 29, 2010

(30) Foreign Application Priority Data
Mar. 2, 2007 (IT) .............................. MI2007A0414

(51) Int. Cl.
*B32B 37/00* (2006.01)
(52) U.S. Cl. ........ 156/187; 156/191; 156/192; 156/289; 156/309.6; 156/322
(58) Field of Classification Search .................. 156/187, 156/188, 191, 192, 244.11, 289, 322, 309.6, 156/308.2
See application file for complete search history.

(56) References Cited

U.S. PATENT DOCUMENTS

| | | | |
|---|---|---|---|
| 3,300,187 A | 1/1967 | Krogstad et al. | |
| 3,470,057 A | 9/1969 | Stuart et al. | |
| 4,125,422 A * | 11/1978 | Stuart et al. | 156/392 |
| 4,257,718 A | 3/1981 | Rosa et al. | |
| 4,574,023 A * | 3/1986 | Edwards et al. | 156/187 |
| 4,913,080 A | 4/1990 | Kindem et al. | |
| 5,395,454 A | 3/1995 | Robert | |
| 5,589,019 A * | 12/1996 | Van Beersel et al. | 156/184 |
| 6,044,787 A | 4/2000 | Elmbo | |
| 6,065,781 A | 5/2000 | Titus | |
| 6,440,245 B1 | 8/2002 | Culzoni | |
| 7,093,860 B2 | 8/2006 | Fawley | |

(Continued)

FOREIGN PATENT DOCUMENTS

DE 102004056462 6/2006

(Continued)

OTHER PUBLICATIONS

International Search Report Apr. 29, 2008 in PCT/EP2007/064524.

(Continued)

*Primary Examiner* — Jeff Aftergut
(74) *Attorney, Agent, or Firm* — Davidson Berquist Jackson & Gowdey, LLP (57) ABSTRACT

A method of forming a protective coat about a cutback between pipes forming part of an underwater pipeline provides for laying a thermoplastic sheet on a supporting sheet; and winding the thermoplastic sheet and the supporting sheet about the cutback to join the thermoplastic sheet to the cutback.

16 Claims, 9 Drawing Sheets

U.S. PATENT DOCUMENTS

| | | | |
|---|---|---|---|
| 2005/0244578 A1 | 11/2005 | Van Egmond | |
| 2010/0133324 A1 | 6/2010 | Leiden et al. | |

FOREIGN PATENT DOCUMENTS

| | | |
|---|---|---|
| EP | 1013514 | 7/2000 |
| EP | 1217276 | 6/2002 |
| FR | 1394983 | 4/1965 |
| FR | 2723006 | 2/1996 |
| GB | 899644 | 6/1962 |
| GB | 2232740 | 12/1990 |

OTHER PUBLICATIONS

U.S. Appl. No. 12/385,794—Mar. 9, 2010 PTO Office Action.
U.S. Appl. No. 12/385,794—Sep. 8, 2011 PTO Office Action.
U.S. Appl. No. 12/449,049—Dec. 15, 2011 PTO Office Action.
International Preliminary Report on Patentability and Written Opinion in PCT Appln. No. PCT/EP2007/061118, mailed Apr. 22, 2009.
U.S. Appl. No. 12/385,794—Mar. 21, 2011 PTO Office Action.
U.S. Appl. No. 12/385,794—Mar. 24, 2011 PTO Office Action.
U.S. Appl. No. 12/448,194—Mar. 31, 2011 PTO Office Action.
International Search Report and Written Opinion mailed Jul. 25, 2008 in PCT/IB2008/000441.
U.S. Appl. No. 12/385,794—Sep. 22, 2010 PTO Office Action.
U.S. Appl. No. 12/448,194—Dec. 3, 2010 PTO Office Action.
European Search Report mailed Apr. 29, 2008 in PCT Application No. PCT/EP2007/064524.
International Search Report and Written Opinion mailed Dec. 17, 2008 in PCT/IB2008/000863.
International Search Report mailed Jan. 31, 2008 in Application PCT/EP2007/061118.
U.S. Appl. No. 12/448,194—Jun. 21, 2010 PTO Office Action.

\* cited by examiner

METHOD FOR FORMING A PROTECTIVE COAT ABOUT A CUTBACK BETWEEN PIPES FORMING PART OF AN UNDERWATER PIPELINE

TECHNICAL FIELD

The present invention relates to a method of forming a protective coat about a cutback between pipes joined end to end to form underwater pipelines.

The method according to the present invention forms part of general method of producing underwater pipelines, and which comprises, among other things, joining the facing free ends of two adjacent pipes, aligned along an axis, to form an annular joint portion known as a cutback; and winding a protective sheet about the cutback.

BACKGROUND ART

Underwater pipelines comprise a number of pipes joined to total lengths of hundreds of kilometers. The pipes are of normally 12-metre standard length, and relatively large diameters ranging between 0.2 and 1.5 metres, and each comprise a steel cylinder; a first coating of polymer material to protect the steel pipe; and possibly a second coating of Gunite or cement to weigh down the pipeline. In some applications, the pipes and underwater pipelines do not need and therefore have no second coating.

To weld the steel cylinders to one another, the opposite free ends of each pipe have no first or second coating. The pipes are joined at on-land installations into multiple-standard-length pipes, as well as on pipeline-laying vessels, on which standard-length or multiple-standard-length pipes are joined to others, in turn already joined to other pipes, to form part of the underwater pipeline.

The actual joining operation comprises welding the steel cylinders, normally in a number of weld passes, and bridging the first and, possibly, second coating. Once an annular weld is formed between two steel cylinders, the cutback, with no first or second coating, extends astride the weld. In other words, the cutback is defined substantially by the free ends of the pipes, extends axially between two end portions of the first coating, and must be protective coated to prevent corrosion.

U.S. Pat. No. 3,470,057 discloses an old technique consisting in winding about the cutback a wrapping material composed of an outer layer of asphalt-impregnated layer or tar-impregnated asbestos and an inner layer of glass fiber embedded in a material such as thermoplastic tar or asphalt. The inner layer is sufficiently thermoplastic so as to be rendered thermoplastic by application of heat.

Cutback protective coating is known as "field joint coating", and comprises coating the cutback with three coats to ensure protection and adhesion of the coats to the steel cylinders. More specifically, cutback protective coating comprises heating, e.g. induction heating, the cutback to 250° C.; spraying the cutback with powdered epoxy (FBE—Fusion Bonded Epoxy) resin, which, in contact with the cutback; forms a relatively thin first coat or "primer"; spraying the cutback, on top of the first coat, with a modified copolymer, which acts as adhesive and, in contact with the first coat, forms a relatively thin second coat; applying a third so-called "top coat", which also extends partly over the first coating; and then bridging the second coating if necessary.

Welding, non-destructive weld testing, and bridging the first and second coating, are performed at joining stations equally spaced along the path of the pipes (or of the pipeline being formed, when the pipes are joined to this). The pipes are therefore advanced in steps, and are stopped at each joining station for a length of time determined by the longest operation, which, at present, is that of applying the third or top coat.

Known methods currently employed to apply the third coat include:
- "cigarette wrapping", which comprises heating, winding, and compressing a number of thin sheets of polymer material about the cutback, on top of the adhesive second coat;
- "spiral wrapping", which comprises heating, double-winding, and compressing a strip about the cutback, on top of the second coat;
- "flame spraying" using a hot spray gun to melt and spray on polymer;
- fitting a mold about the cutback, and injecting liquid polymer about the cutback, on top of the second coat;
- preparing a polymer strip having a heat-shrink outer protective layer (third coat) and an adhesive inner layer (second coat); heat-shrinking the strip; and melting the adhesive inner layer so the strip adheres firmly to the first coat. This last method differs from the previous methods by simultaneously applying the second and third coat.

All the above methods of applying the third coat are extremely time-consuming. More specifically, coating large cutbacks, such as those of a 48-inch (roughly 1.2-metre) diameter steel cylinder, calls for applying a relatively long third coat, which, in addition, may be as much as 5 mm thick and 400 mm wide. In other words, since, in most cases, the mass of polymer material to be applied to form the third coat is relatively considerable, and the third coat must be plastic enough, when applied, to achieve effective chemical/mechanical adhesion to the second coat, known methods of applying the third coat do not allow a satisfactory reduction in coating time.

Moreover, when applying the third coat using known methods, small amounts of air may become trapped between the third coat and underlying coats, and are particularly harmful by preventing firm grip of the third coat to the underlying coats, and possibly impairing the field joint coating as a whole.

DISCLOSURE OF INVENTION

It is an object of the present invention to provide a method of forming a protective coat about a cutback between two pipes, designed to eliminate the drawbacks of the known art.

According to the present invention, there is provided a method of forming a protective coat about a cutback between pipes forming part of an underwater pipeline; the method comprising laying a thermoplastic sheet on a supporting sheet; winding the thermoplastic sheet and the supporting sheet about the cutback to join the thermoplastic sheet to the cutback and forming the protective coat; and removing the supporting sheet when the protective coat is completed.

The method according to the present invention has the advantage of applying the thermoplastic sheet at very high temperature, and therefore in such a plastic condition as to fill any gaps; while the supporting sheet prevents in-handling deformation of the thermoplastic sheet, even when highly plastic.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
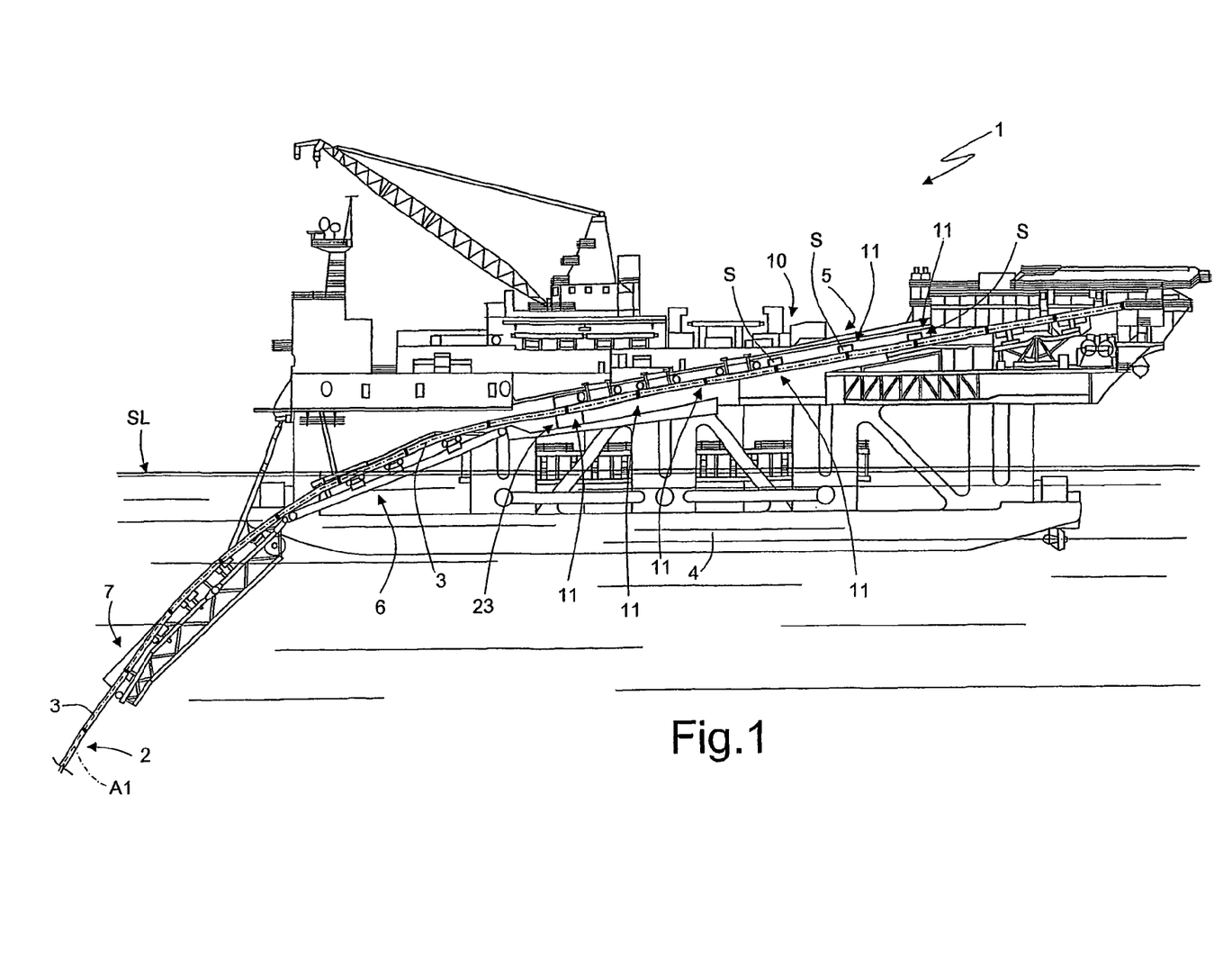
FIG. 1 shows a side view, with parts removed for clarity, of an underwater-pipeline-laying vessel implementing the method according to the present invention.

Number 1 in FIG. 1 indicates a pipeline-laying vessel in the process of producing and laying in the sea (SL indicates sea level) an underwater pipeline 2 comprising pipes 3 joined to one another. Vessel 1 comprises buoyancy hulls 4; an above-water tunnel 5; a partly above-water, inside ramp 6; an underwater outside ramp 7; and a work line 10 extending along tunnel 5 and the above-water portion of inside ramp 6.

The partly formed underwater pipeline 2 and pipes 3 ready for joining to it extend along an axis A1 of work line 10, which comprises a number of joining stations 11 equally spaced along axis A1, and each for performing a given operation, such as welding, non-destructive testing, or bridging a coating.

The distance between adjacent joining stations 11 equals the standard length, about 12 metres, of each pipe 3, or a multiple of the standard length, when joining, along line 10, multiple-standard-length pipes 3 joined beforehand at on-land installations or off-line on the vessel.

Figure 2:
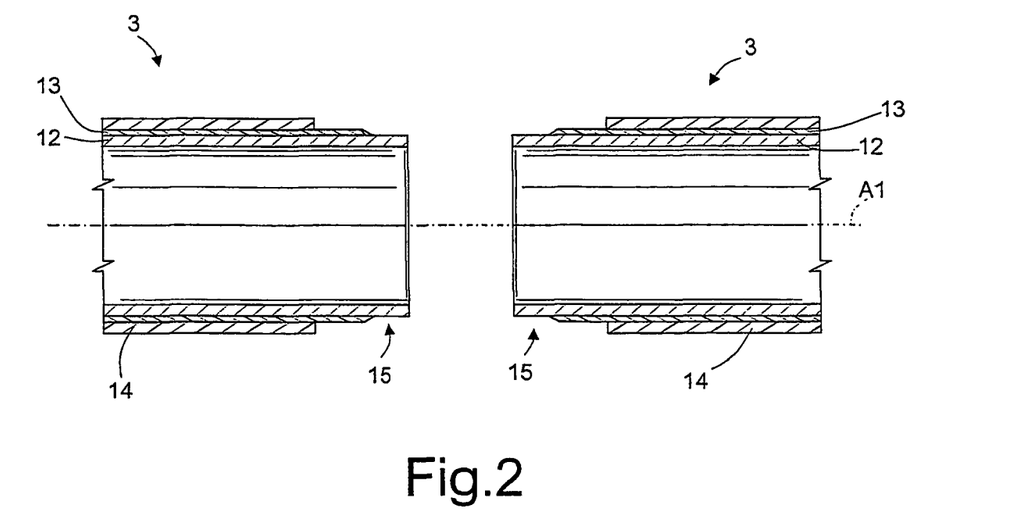
FIGS. 2 and 3 show sections, with parts removed for clarity, of pipes at various joining stages.

With reference to FIG. 2, each pipe 3 comprises a steel cylinder 12; a first polymer coating 13, normally of polyethylene or polypropylene, contacting and for corrosion proofing steel cylinder 12; and a second coating 14 of Gunite or cement for weighing down underwater pipeline 2.

In an alternative embodiment not shown, the pipes have no second coating.

Each pipe 3 has two opposite free ends 15 (only one shown in FIGS. 2 and 3) with no first coating 13 and no second coating 14; and first coating 13 has a bevel 16 at each free end 15.

Figure 3:
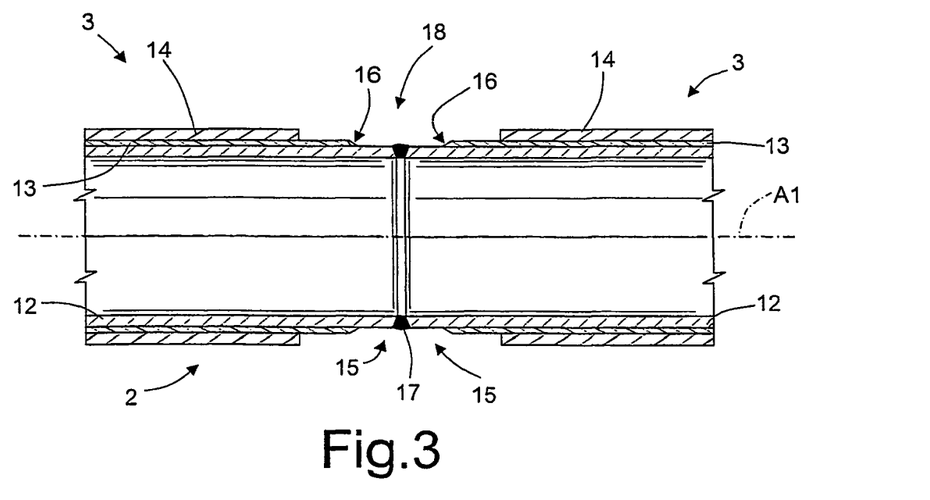

Two consecutive pipes 3, aligned along axis A1 (FIG. 2), are positioned with free ends 15 parallel, facing, and close together, and are welded—possibly in a number of weld passes at successive joining stations 11—to form an annular weld bead 17 between pipes 3 (FIG. 3). With reference to FIG. 3, two welded pipes 3 form a cutback 18 extending along axis A1, between two successive bevels 16 of first coating 13, and along annular weld bead 17.

In addition to welding cylinders 12, joining pipes 3 also comprises bridging first coating 13 and second coating 14. Bridging first coating 13 comprises surface treating (shot peening) cutback 18; induction heating cutback 18 to 250° C.; and applying a first coat 19, second coat 20, and third coat 21 of polymer material to cutback 18 in rapid succession (FIG. 9).

Figure 4:
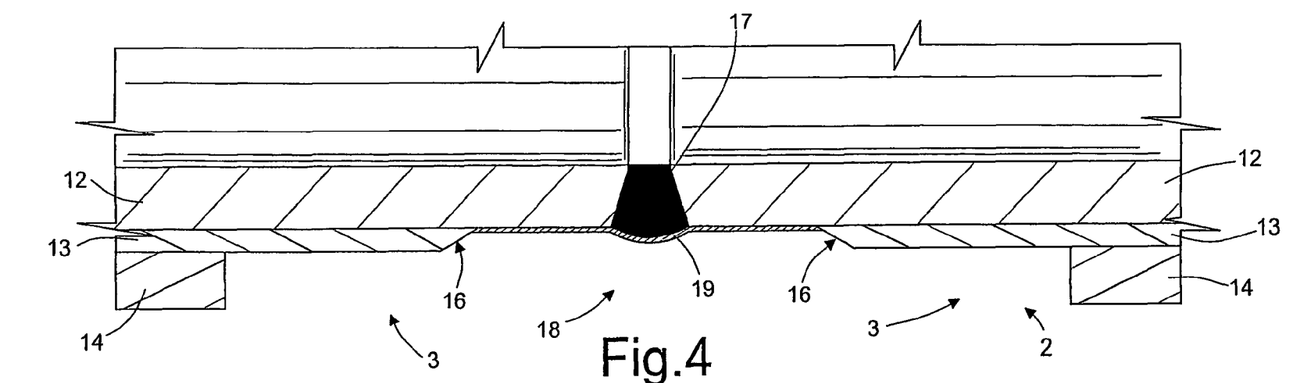
FIGS. 4 and 5 show larger-scale sections, with parts removed for clarity, of pipes at various stages in formation of the protective coat.

With reference to FIG. 4, first coat 19 is 100 to 500 microns thick, and is made of epoxy (FBE: Fusion Bonded Epoxy) resin applied to cutback 18 in powdered form using a spray gun not shown in the drawings.

Figure 5:
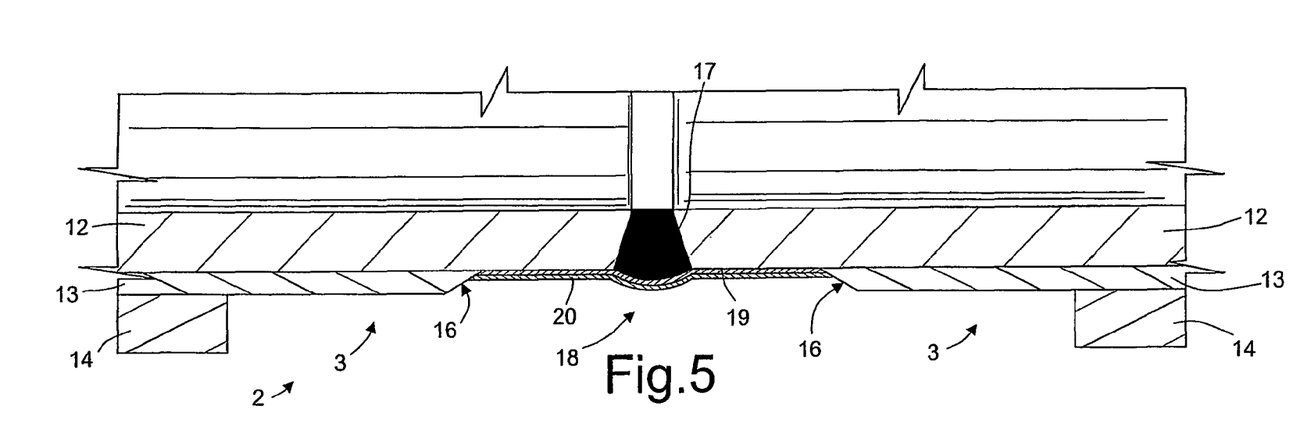

With reference to FIG. 5, second coat 20 is 100 to 500 microns thick, and is made of a modified copolymer, normally CMPE or CMPP, applied in powdered form about cutback 18; on top of first coat 19, using a spray gun not shown in the drawings.

Figure 9:
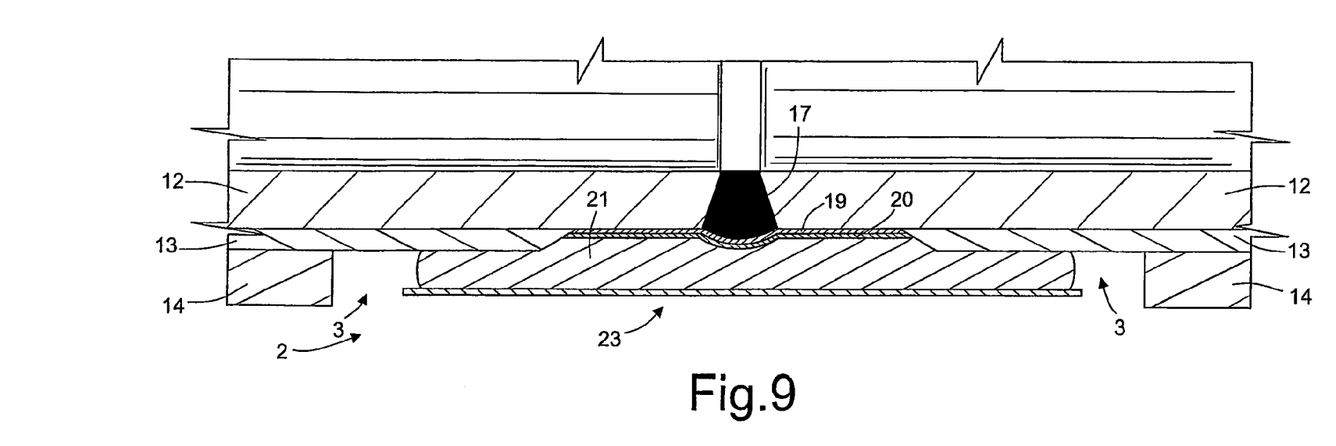
Figure 11:
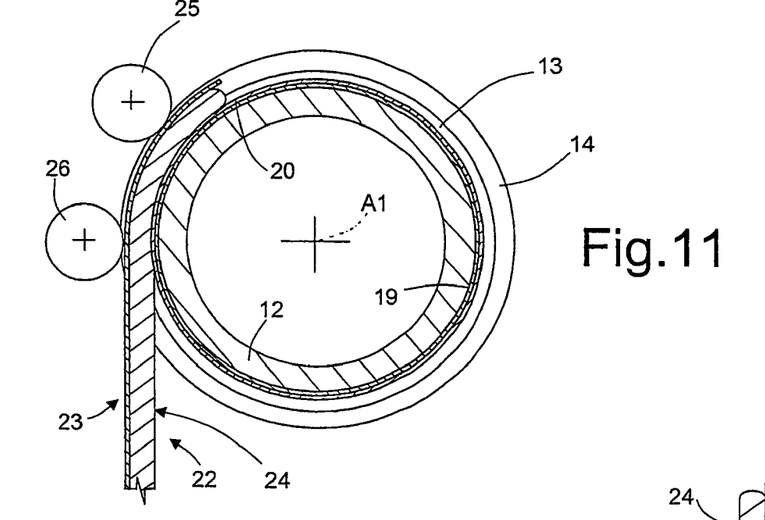
FIGS. 11 and 12 show cross sections, with parts removed for clarity, of further steps in the method according to the present invention.

With reference to FIG. 9, third coat 21 is 2 to 5 mm thick, and is made of a modified copolymer, normally CMPE or CMPP, applied by winding a single thermoplastic sheet 22 about cutback 18 at a joining station 11, as shown in FIG. 11. In the example shown, sheet 22 is made of a modified copolymer, is wound about cutback 18 at a joining station 11 (FIG. 1), is wider than cutback 18 (measured along axis A1) so as to overlap first coatings 13 of both joined pipes 3, and is long enough to wind completely about the circumference of cutback 18 and overlap the end portions of sheet 22.

Figure 6:
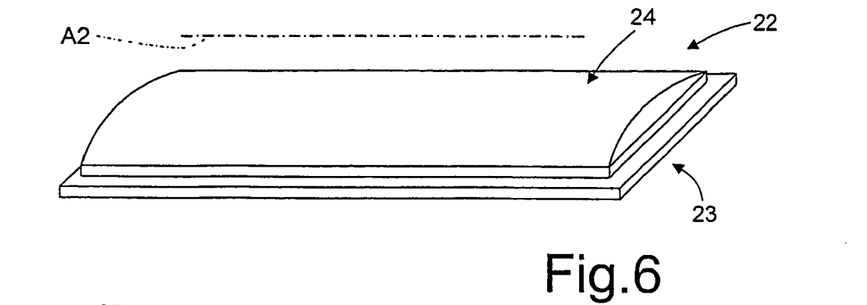
FIG. 6 shows a view in perspective, with parts removed for clarity, of one step in the method according to the present invention.

With reference to FIG. 6, the method of applying sheet 22 comprises laying sheet 22 on a flexible supporting sheet 23, which can be done in substantially two ways: by extruding sheet 22 directly onto sheet 23 at station 11, or withdrawing sheet 22 from a store at station 11 and simply laying it on sheet 23.

Sheet 23 is rectangular, is slightly larger than sheet 22, and is made of very thin metal material for flexibility, or of high-temperature-resistant silicone.

Sheet 22 is rectangular, extends lengthwise parallel to an axis A2, and has a contoured face 24. That is, sheet 22 varies in thickness crosswise to axis A2, is thickest in the centre and thinnest at the edges parallel to axis A2, and is of substantially constant thickness in the directions parallel to axis A2. In the FIG. 6 example, the contoured face 24 of sheet 22 is a convex face parallel to axis A2, and which eventually defines the surface contacting second coat 20 and the overlapped first coatings 13.

To ensure a high degree of plasticity of the thermoplastic material of sheet 22, the method provides for winding sheet 22, at a temperature of over 130° C., about cutback 18. The necessary temperature can be achieved in two ways: one, by extruding sheet 22 at station 11, simultaneously depositing sheet 22 on sheet 23, and applying sheet 22 immediately, before it cools, about cutback 18; and, two, by heating sheet 22, laid on sheet 23, before sheet 22 is wound on.

Figure 7:
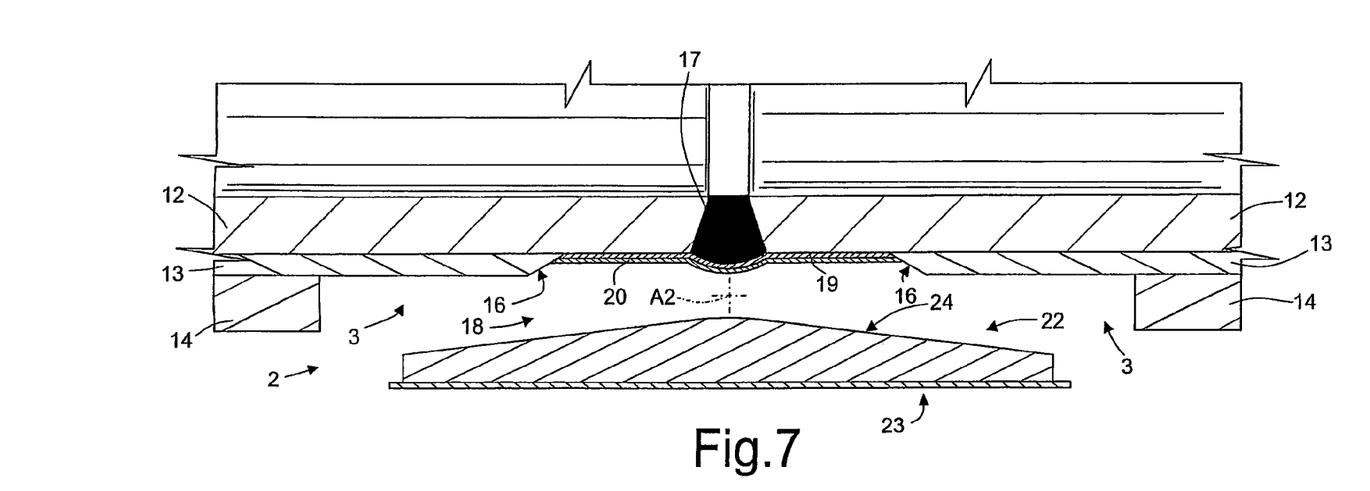
FIGS. 7 to 10 show longitudinal sections, with parts removed for clarity, of steps in the method according to the present invention.

Once sheet 22 is at the right temperature, sheet 23 and sheet 22 are positioned at cutback 18 in the flat configuration shown in FIG. 7, in which, axis A2 is substantially perpendicular to axis A1, and sheet 22 is substantially centred with respect to cutback 18.

Figure 8:
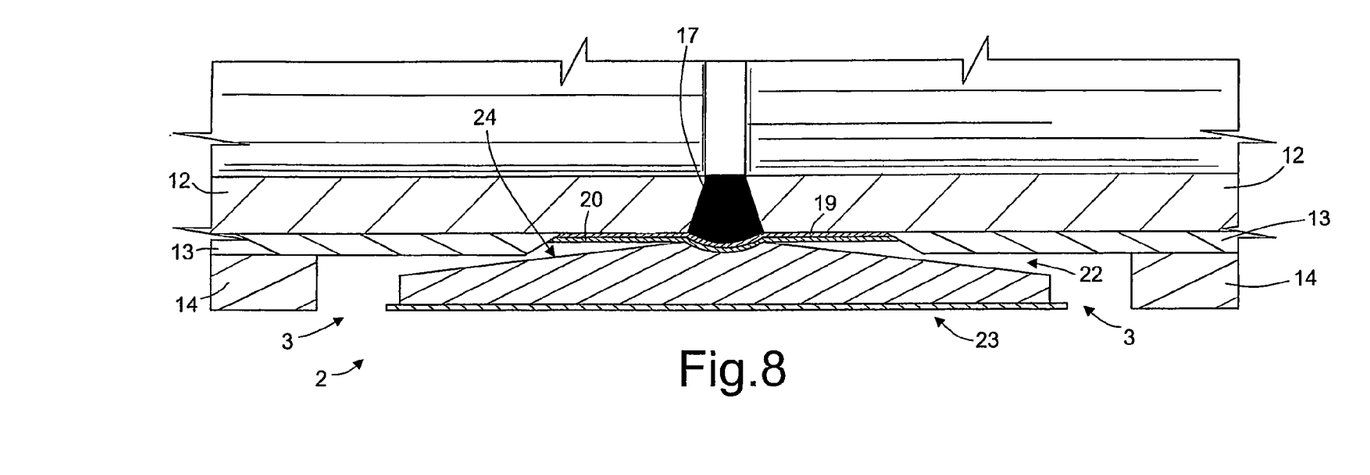
Figure 12:
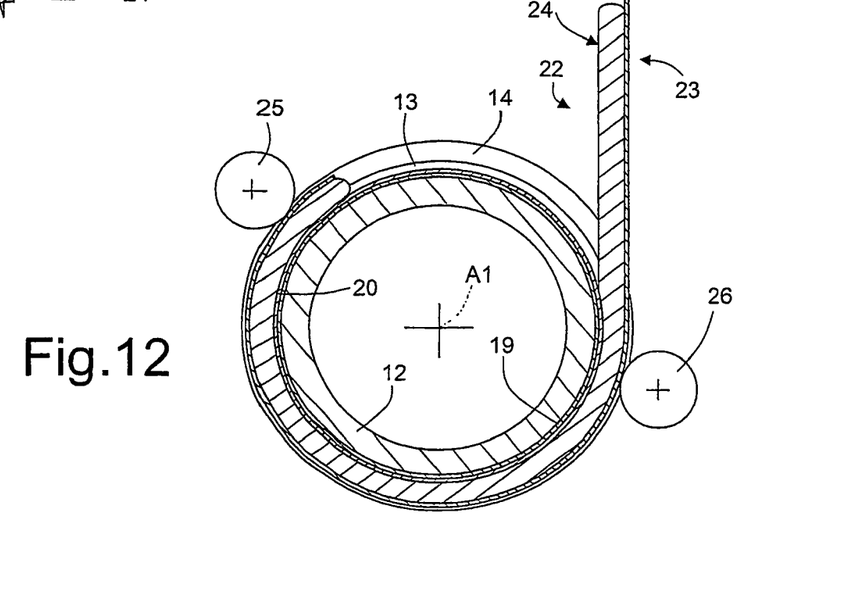

Next, sheet 22 and sheet 23, both in the flat configuration, are moved up closer to lay a portion of contoured face 24 of sheet 22 on second coat 20, as shown in FIG. 8, and are pressed onto cutback 18 to locally deform sheet 22 and gradually adapt face 24 outwards from the centre of cutback 18. Pressure is applied to sheet 22 through sheet 23 by means of a roller or two rollers 25 and 26, as shown in FIGS. 11 and 12. Roller 26 is rolled about axis A1 to press on the whole of sheet 22, whereas roller 25 holds the end of sheet 22 on cutback 18, as shown in FIG. 12.

Figure 13:
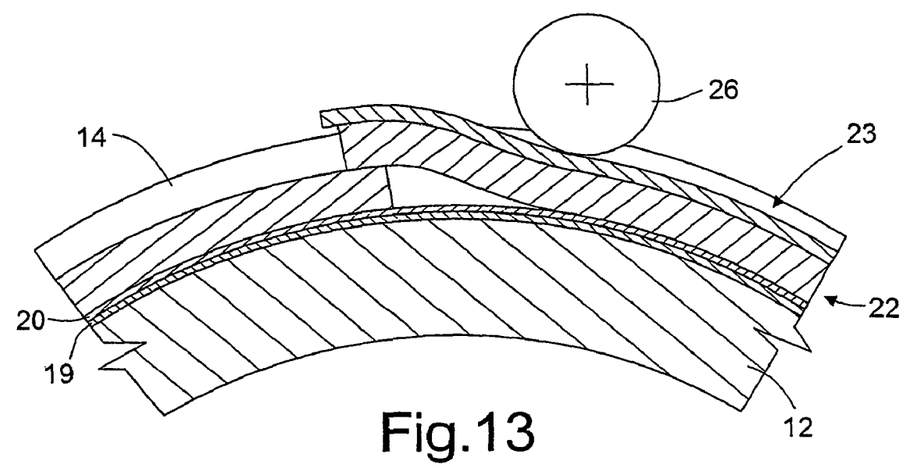
FIG. 13 shows a larger-scale cross section, with parts removed for clarity, of a step in the method according to the present invention.

With reference to FIG. 13, when sheet 22 is more or less completely wound about cutback 18, roller 25 is moved to partly detach the end portion of sheet 23. Sheet 23 springs back off when made of metal material, or is detached when made of silicone. Roller 26 thus continues its winding movement, and secures the free end of sheet 22 to the end of sheet 22 on cutback 18. Once the ends are joined, the third coat 21 is completed, and sheet 23 is removed and may be used in applying another sheet 22 to another cutback 18.

Figure 10:
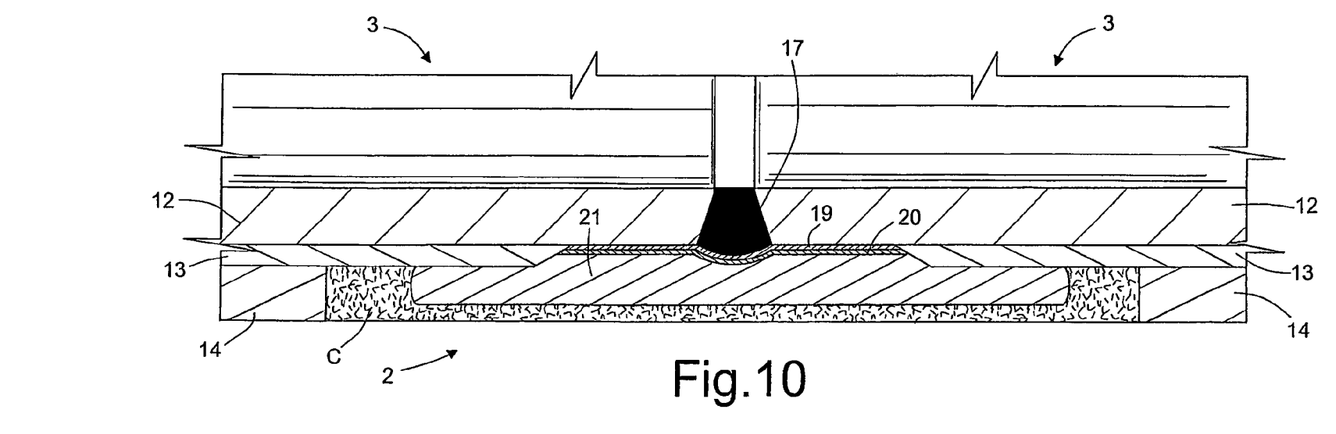

Third coat 21 may be covered with a layer C of cement or Gunite, as shown in FIG. 10.

Figure 14:
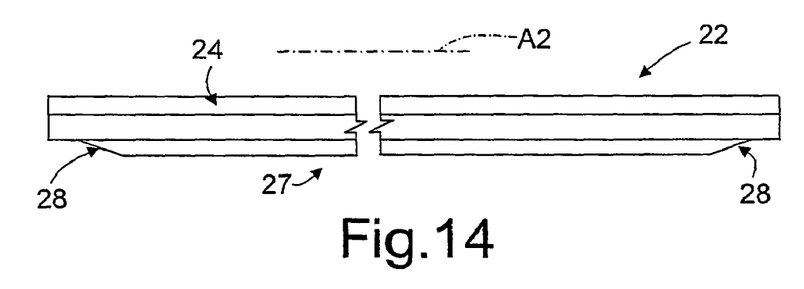
FIG. 14 shows a side view, with parts removed for clarity, of a variation of the FIG. 6 step.

In the FIG. 14 variation, sheet 22 is slightly shorter than the circumference of cutback 18, and is laid on a sheet 27, which is slightly shorter than sheet and has bevelled edges 28 along its short sides. Sheet 22 is laid on sheet 27 so that the opposite ends of sheet 22 project slightly from the bevelled edges of sheet 27, and bevelled edges 28 converge with the ends of sheet 22.

Figure 15:
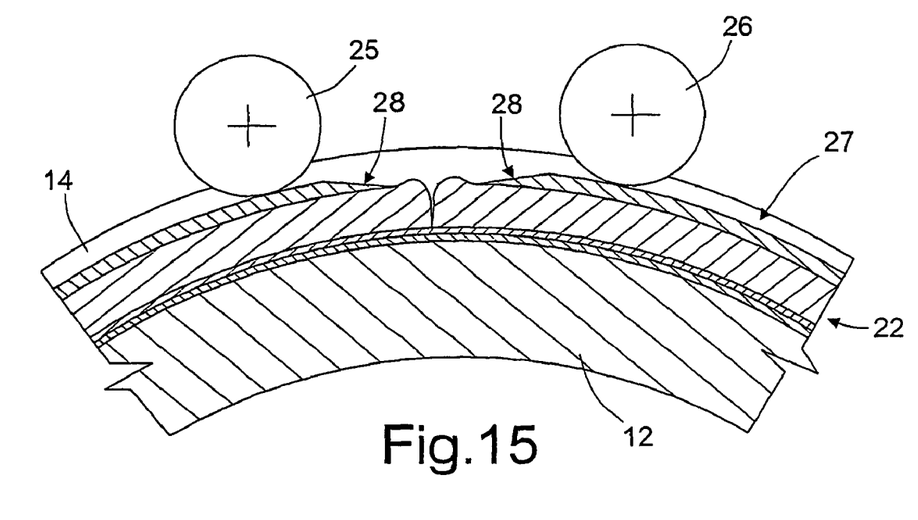
FIG. 15 shows a larger-scale cross section, with parts removed for clarity, of a variation of the FIG. 13 step.

As sheet 22 is wound and pressed, the free ends of sheet 22 therefore swell, due to creep of the material, as shown in FIG. 15, and rollers 25 and 26 press and seal the swollen free ends firmly to one another.

Next, a layer C of cement (or Gunite) is formed to bridge the outer coating 14 in known manner.

Figure 16:
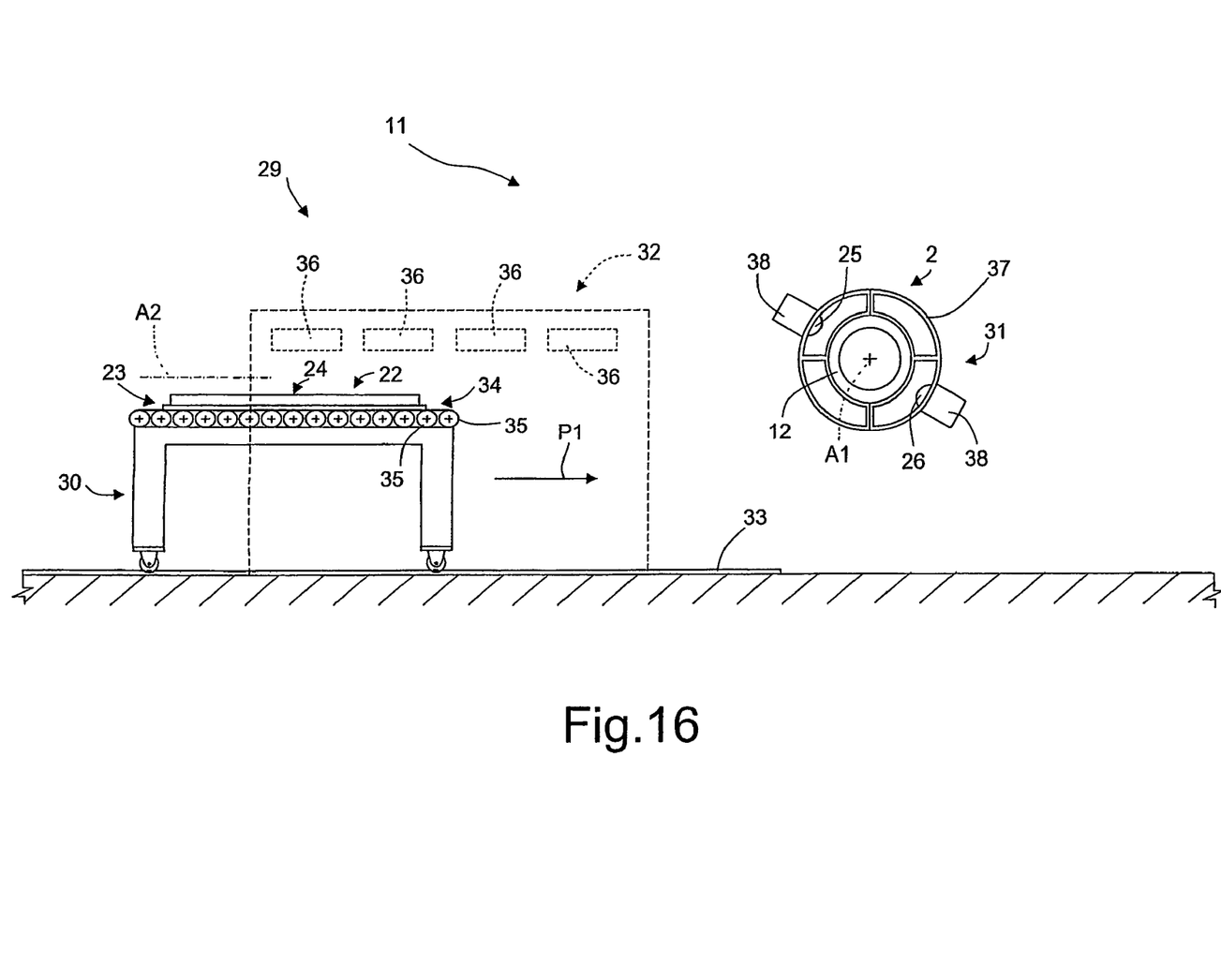
FIG. 16 shows a schematic front view, with parts removed for clarity, of an apparatus for forming a protective coat in accordance with the present invention.

Number 29 in FIG. 16 indicates an apparatus for applying sheet 22 to cutback 18 at a joining station 11 (FIG. 1).

Apparatus 29 is located at joining station 11, and comprises a trolley 30 movable along a path P1 crosswise to axis A1; a winding device 31 fixed to pipeline 2 being produced; an oven 32 located along path P1; and possibly an extruder (not shown) or a store (not shown) of sheets 22.

Trolley 30 runs along rails 33 defining path P1, and has a supporting surface 34 defined by parallel, side by side rollers 35 and for supporting sheet 23 or 27.

Oven 32 is a tunnel type to allow the whole of trolley 30 to travel through it, and comprises heating elements 36.

Apparatus 29 comprises two annular structures 37 (only one shown in FIG. 16); and two satellites 38 guided by annular structures 37 and supporting rollers 25 and 26 respectively.

Annular structures 37 are located on opposite sides of cutback 18, in accordance with a widely used pipe-joining technique described, for example, in WO 00/45986, as regards pipe welding, and in U.S. Pat. No. 6,440,245, as regards cutback coating.

Each satellite 38 is supported and guided along an annular path defined by annular structures 37, and comprises a first motor (not shown) for moving the satellite along the annular path, and a second motor for moving respective roller 25, 26 to and from cutback 18 when applying sheet 22 as described above.

The operations performed by apparatus 29 are clearly inferable from the above description of the method of applying sheet 22.

Figure 17:
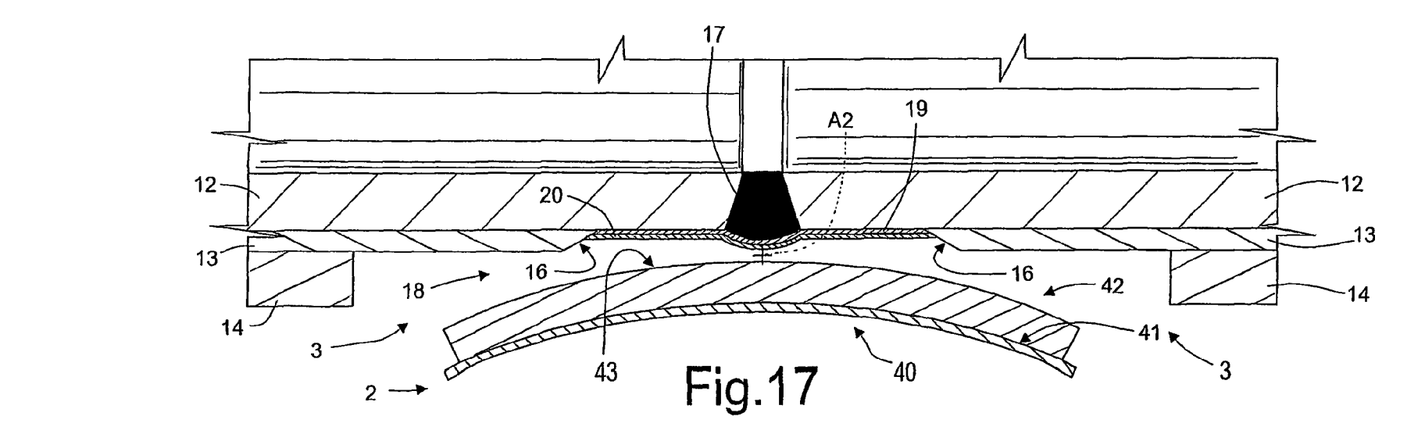
FIGS. 17 and 18 show longitudinal sections, with parts removed for clarity, of steps in a variation of the method according to the present invention.

Number 40 in FIG. 17 indicates a curved, rectangular supporting sheet having a convex face 41, the convexity of which is parallel to axis A2 parallel to the longer dimension of sheet 40. And the method provides for laying on convex face 41 of sheet 40 a thermoplastic sheet 42 which, unlike sheet 22, has a substantially rectangular cross section, and is of constant thickness in all directions. When laid on sheet 40, sheet 42 assumes a curved configuration, in which the face 43 of sheet 42 assumes substantially the same convex configuration as face 41 of sheet 40.

Figure 18:
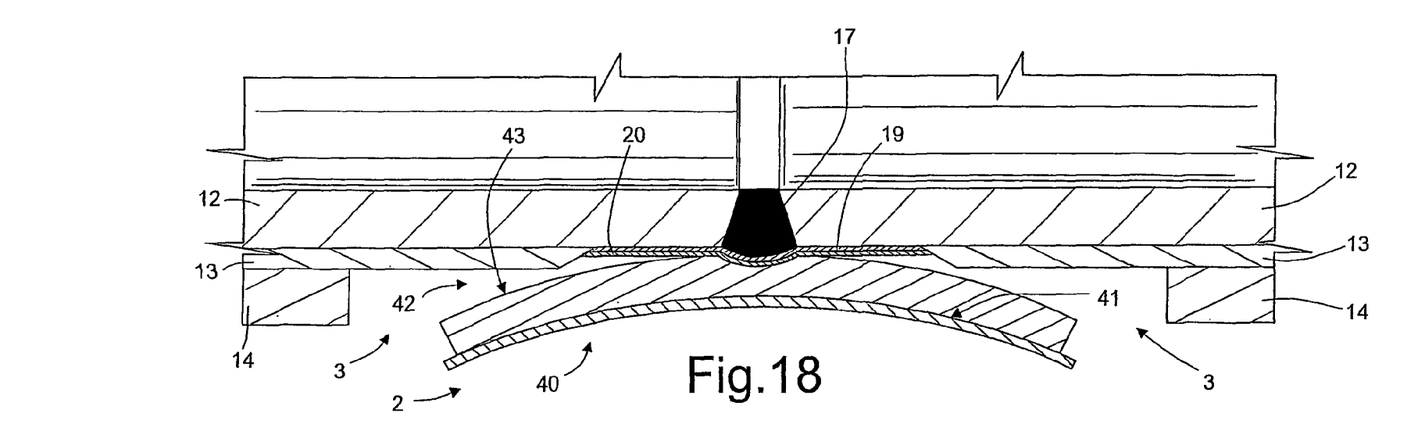

Sheet 42 is applied in the same way as sheet 22, except that, in this case, sheet 40 and sheet 42 assume substantially flat configuration when pressed by rollers 25 and 26 and wound about cutback 18.

In a further variation, not shown, the supporting sheet is rectangular and defined by rigid sectors hinged to one another about axes perpendicular to an axis parallel to the longer dimension of the sheet.

The supporting sheets have knurled faces to improve adhesion of the thermoplastic sheets, and holes or cavities at the ends to assist detachment of the supporting sheets from the thermoplastic sheets.

Applying the thermoplastic sheet using a supporting sheet substantially has the advantages of enabling application of a highly plastic thermoplastic sheet, without compromising the structure of the thermoplastic sheet, and of configuring the face of the thermoplastic sheet laid on the cutback. The face laid on the cutback is advantageously of varying thickness, so that adhesion occurs gradually in wavelike manner, thus preventing air from becoming trapped between the thermoplastic sheet and the cutback.

The invention claimed is:

1. A method of forming a protective coat about a cutback between pipes forming part of an underwater pipeline; the method comprising laying a thermoplastic sheet on a supporting sheet; winding the thermoplastic sheet and the supporting sheet about the cutback to join the thermoplastic sheet to the cutback and forming the protective coat; and removing the supporting sheet when the protective coat is completed.

2. A method as claimed in claim 1 comprising pressing the thermoplastic sheet and the supporting sheet onto the cutback by means of at least one roller movable about the cutback.

3. A method as claimed in claim 1, wherein the thermoplastic sheet is made of polypropylene; the method providing for winding the thermoplastic sheet about the cutback when the thermoplastic sheet is at a temperature of over 130° C.

4. A method as claimed in claim 3, comprising heating the thermoplastic sheet to a temperature of over 130° C., when the thermoplastic sheet is laid on the supporting sheet.

5. A method as claimed in claim 3, comprising extruding the thermoplastic sheet at a temperature of over 130° C., and simultaneously laying the thermoplastic sheet on the supporting sheet.

6. A method as claimed in claim 1, wherein the cutback extends about a first axis; and the thermoplastic sheet, when laid on the supporting sheet, is of a length substantially equal to the circumference of the cutback, and has a contoured face parallel to a second axis and sloping downwards to the lateral edges of the thermoplastic sheet.

7. A method as claimed in claim 6, wherein the thermoplastic sheet varies in thickness crosswise to the second axis, and is thickest at the centre.

8. A method as claimed in claim 6, wherein the contoured face is convex.

9. A method as claimed in claim 6, comprising laying the thermoplastic sheet on a supporting sheet in substantially flat configuration.

10. A method as claimed in claim 6, comprising laying the thermoplastic sheet on a supporting sheet in substantially curved configuration having a convex face contacting the thermoplastic sheet and parallel to the second axis (A2).

11. A method as claimed in claim 10, wherein the thermoplastic sheet is of constant thickness.

12. A method as claimed in claim 6 comprising positioning the thermoplastic sheet close to the cutback, with the contoured face facing the cutback, and with the second axis (A2) substantially perpendicular to the first axis (A1).

13. A method as claimed in claim 1, wherein the thermoplastic sheet is shorter in length than the supporting sheet.

14. A method as claimed in claim 1, wherein the thermoplastic sheet is longer than the supporting sheet; the opposite ends of the thermoplastic sheet projecting with respect to the supporting sheet.

15. A method as claimed in claim 1, wherein the supporting sheet is flexible.

16. A method as claimed in claim 1, wherein the supporting sheet is elastic.

* * * * *

UNITED STATES PATENT AND TRADEMARK OFFICE
CERTIFICATE OF CORRECTION

| | | |
|---|---|---|
| PATENT NO. | : 8,287,679 B2 | Page 1 of 1 |
| APPLICATION NO. | : 12/449900 | |
| DATED | : October 16, 2012 | |
| INVENTOR(S) | : Valerio Bregonzio | |

It is certified that error appears in the above-identified patent and that said Letters Patent is hereby corrected as shown below:

On the title page, item (75), the inventor's city of residence should read --San Giuliano Milanese (IT)--

Signed and Sealed this
Twelfth Day of August, 2014

Michelle K. Lee
*Deputy Director of the United States Patent and Trademark Office*